3,304,729
CRYOGENIC STORAGE SYSTEM
William A. Chandler, Dickinson, and Robert R. Rice, South Houston, Tex., assignors to the United States of America as represented by the Administrator of the National Aeronautics and Space Administration
Filed Oct. 22, 1965, Ser. No. 502,729
7 Claims. (Cl. 62—45)

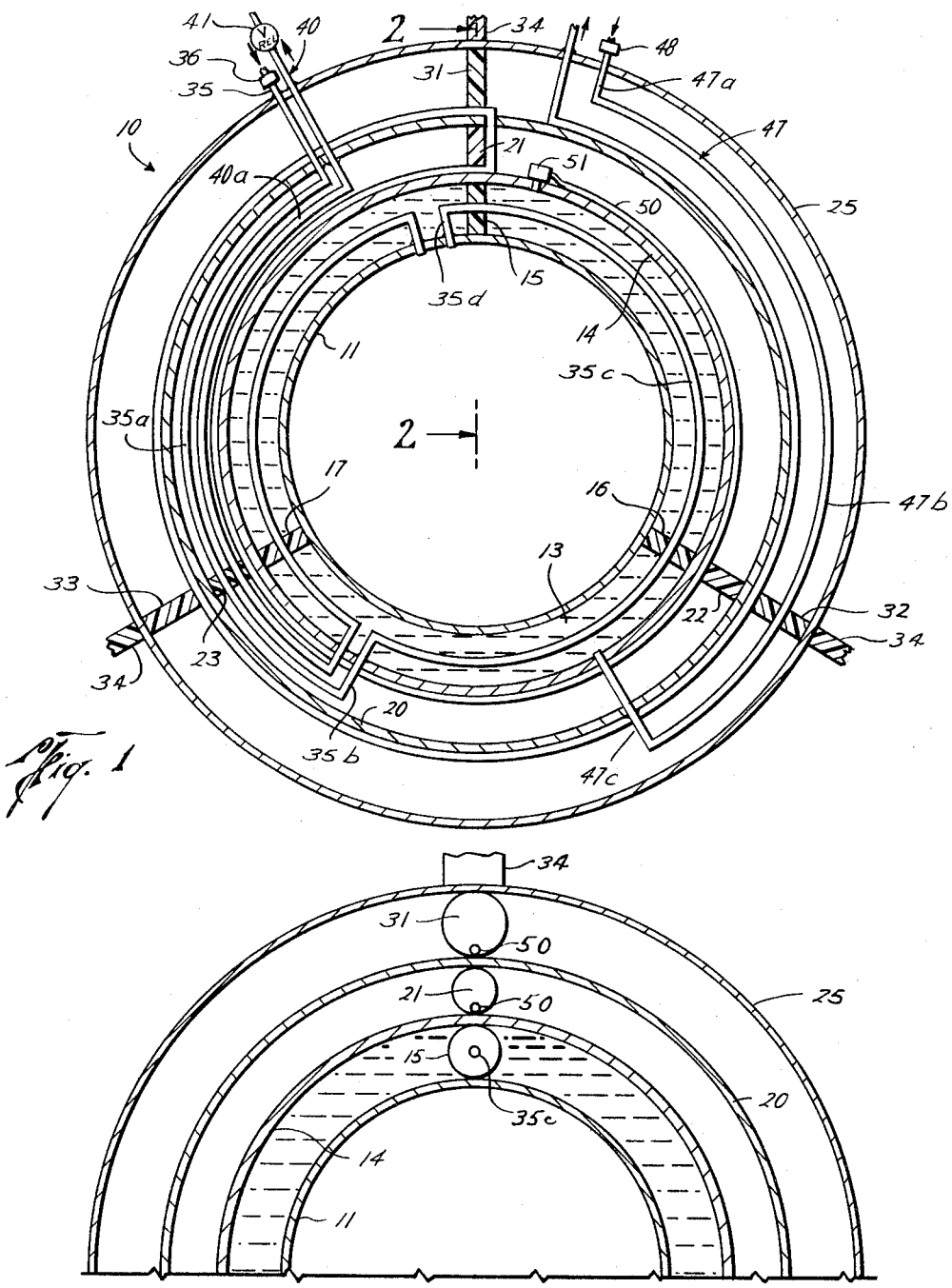

The invention described herein may be manufactured and used by or for the Government of the United States of America for governmental purposes without the payment of any royalty thereon or therefor.

This invention relates to the storage of gaseous fluids and more particularly to the storage of gases to be used in spacecraft systems.

The weight and size of space vehicle systems are usually important considerations in aerospace technology. This is particularly true as regards spacecraft systems which utilize gaseous fluids, as for example the spacecraft's propulsion systems, its environmental control system, and the reactant gases supply for fuel cell power systems. Since very large quantities of fluid are usually desired relative to the volume limitations imposed, the gaseous fluids in such space vehicle systems are customarily stored at cryogenic temperatures.

A conventional system which has been used in aircraft and spacecraft for the storage of fluids is the high pressure ambient temperature type. This approach incurs high system weight penalties due to the fact that relatively thick walled pressure vessels are required to store relatively small quantities of gases. In other conventional systems such as a liquid helium system for laboratory use, the helium is stored in cryogenic liquid form within a container whch is enveloped by a second container also carrying a cryogenic liquid. For reducing evaporation losses of the cryogenics due to absorption of heat from surrounding materials, the storage containers for the primary fluid and the enveloping cryogenic are separated by either an insulating material or a vacuum spacing, with consequent penalties in system weight and size. In these systems a long pressure buildup time is usually required before the primary fluid reaches operational pressure.

The fluid storage system and method of this invention, which have been devised to overcome attendant disadvantages of the prior art, are particularly adapted for the storing of a gaseous fluid over a period of time while using a relatively small volume storage system with as low a weight penalty as possible. In the storage system of this invention a gas such as helium, which because of its low gas density, inert chemical activity, and other favorable characteristics, is often used as a pressurant fluid in space vehicle systems, is stored at supercritical pressure and low temperature within a pressure vessel which is surrounded by a bath of a subcritical cryogen. The pressure selected for the stored fluid will be determined by its desired delivery pressure which for most applications will exceed 1500 p.s.i. The subcritical cryogen selection is characterized by a low temperature boiling point, a high heat sink capacity, and high sensible heat, whereby the system takes advantage of these properties to maintain the supercritical gas at the saturation temperature of the subcritical liquid cryogen for so long as liquid cryogen is present.

In addition to the cryogen container which completely encloses the gas pressure vessel, the system further includes a metallic shield which envelops the refrigerant cryogen container, but in spaced relationship thereto, and an outer enclosing shell or vessel which is spaced from and completely encloses the metallic shield. The metallic shield serves as an isothermal heat barrier to ambient radiant heat which would otherwise reach the cryogen container. In addition, a vacuum is drawn in the spaces between the metallic shield and the outer shell and between the metallic shield and the cryogen container so as to inhibit heat transfer to the cryogen by conduction or convection. To further minimize radiant heat transfer, all vessel and shield surfaces which are exposed to the vacuum and the liquid cryogen are plated with a low emissivity coating.

Since it is impossible to preclude all heat leakage, the liquid cryogen will gradually evaporate and its container is therefore a pressure vessel which is provided with an outlet vent to avoid a dangerous pressure buildup. The outlet vent is particularly important where a long "stand-by" period is expected. A throttling valve installed in the outlet vent maintains the cryogen within its container at a predetermined constant pressure and boiling point with a constant latent heat of vaporization. As the liquid cryogen gradually boils away, the vaporized cryogen is exhausted through the throttling valve and a venting conduit which is wrapped around the cryogen container in engaging relationship therewith. The cryogen gas which passes through the throttling valve is subjected to a constant enthalpy expansion with a lowering in pressure and temperature so that the venting conduit through which it is exhausted is essentially a refrigerating pipe and heat exchanger which assists in maintaining the stored liquid cryogen at low temperature. The same refrigerating pipe is also wrapped about the metallic shield before exiting through the outer vessel which encloses the system and thereby provides for vapor cooling of the shield as the liquid cryogen boils away.

As the liquid cryogen slowly evaporates and is exhausted, the weight of the storage system of this invention gradually decreases, although the temperature of the stored gas is maintained at the saturation temperature of the cryogen for so long as there is any liquid cryogen remaining. After all the cryogen has been evaporated, the weight of the system is significantly less than its original value, and when considered over the period of evaporation of the cryogen, will average less than the weight of conventional systems, particularly for those systems designed for storage times extending to several days. Since the advantage is enhanced as the storage period of consideration is extended, this system has particular usefulness in long duration space flights where the "average" weight of a system is of importance.

Furthermore, in the storage system of this invention the primary fluid is stored as a gas rather than as a cryogenic liquid, so that the storage system and associated systems for supplying the primary fluid are less complex than is characteristic of conventional cryogenic storage and supply systems. Since the primary fluid is loaded and maintained at operational pressure, the system has the added advantage that a waiting period is not required before it can be used.

Other objects and many of the attendant advantages of this invention will be readily appreciated as the same become better understood by reference to the following detailed description when considered in connection with the accompanying drawings in which like reference numerals designate like parts throughout the figures thereof, and wherein:

FIG. 1 is a vertical sectional view through a gaseous fluid storage system which embodies the apparatus of this invention; and FIG. 2 is a sectional view of a part of the apparatus of this invention as taken along the line 2—2 in FIG. 1 and looking in the direction of the arrows.

Referring more particularly to the drawings, there is shown in FIG. 1 a storage system 10 which embodies the apparatus of this invention. The storage system comprises an inner pressure vessel 11, preferably of spherical form, which stores a supply of gaseous fluid which is to be used in a spacecraft system. The pressure vessel 11 is fabricated of titanium which is compatible with the storage of helium for which the system herein illustrated is particularly designed, although aluminum and stainless steel might also be used. For storage of oxygen, however, a nickel-chromium iron alloy such as commercially available Inconel 718 could be used, in view of the incompatability of titanium and oxygen.

The gaseous fluid is stored in the vessel 11 at supercritical pressure and low temperature, surrounded by a bath of subcritical cryogen 13 which is characterized by a low boiling point, a high latent heat of vaporization, and high sensible heat capacity. For the storage of helium by this invention, liquid hydrogen is preferred as the liquid cryogen since it has a low boiling point of approximately 20° K. and a relatively high latent heat of vaporization of approximately 107 calories per gram. It also has a high specific heat of 3.4 B.t.u. per pound-degree Fahrenheit. The liquid cryogen is contained by a spherical pressure vessel 14 which is disposed in concentric spaced relation to the inner pressure vessel 11 by means of support members 15, 16, and 17. The support members are fabricated of a very low thermal conductivity material such as Fiberglas or Kel-F, a thermoplastic polymer, and are preferably of ovoid or disc shape to reduce the area of contact. The container 14 is fabricated of Inconel 718, although other materials might suitably be employed.

The system 10 also includes a heat conductive spherical shield 20 which surrounds the pressure vessel 14. The shield is fabricated of aluminum or other lightweight highly conductive material such as beryllium, and is supported in spaced concentric relationship to the vessel 14 by means of Kel-F support discs 21, 22, and 23. In addition, an outer vacuum spherical vessel 25 of titanium or other lightweight vacuum vessel material such as beryllium, is provided which completely encloses the shield and is similarly supported in spaced relation therefrom by means of Kel-F support discs 31, 32, and 33. The shield serves as an isothermal heat barrier to ambient radiant heat directed towards the cryogen container, and to further reduce radiant heat transfer a coating of gold, silver, or copper is plated on all vessel and shield surfaces excepting the inner surface of the inner pressure vessel 11, thereby reducing their emissivity to minimize radiant heat transfer. In addition, a vacuum is drawn in the space between the outer vessel 25 and the shield and also between the shield and the cryogen container 14, which serves to inhibit heat transfer by conduction or convection. The external supports 34 which secure the system to the spacecraft structure may be metallic, or of other suitable material.

The pressure vessel 11 is filled through a fill conduit 35 through either a solenoid valve or a quick disconnect 36 by which the conduit is closed off after filling. The fill conduit 35 extends radially inwardly through the outer vessel 25 and the shield, and includes an arcuate shaped portion 35a disposed between the metallic shield and the container 14, a straight section 35b directed radially inwardly through the container 14, and an arcuate shaped portion 35c which is disposed between the container 14 and the pressure vessel 11 and communicates at one end with the vessel 11 by a conduit section 35d. The arcuate portion 35a is held spaced between the shield and the pressure vessel by means of the support disc 23 and in similar manner the support disc 16 holds the arcuate portion 35c between the cryogen container and pressure vessel 11. The devious route which is provided the fill conduit by means of its arcuate sections serves to reduce heat transfer from the ambient to the pressure vessel 11.

The outlet for the inner vessel 11 is by means of a conduit 40 of substantially identical shape to the inlet conduit 35. The outlet conduit 40 is provided with similar arcuate portions 40a and 40c, also for reducing heat transfer from the ambient. The pressure for the stored helium is maintained by demand pressure control valves in the fluid system communicating with the outlet conduit 40. A pressure relief valve 41 is also provided. The pressure initially selected will be determined by the desired delivery pressure, which for most applications will exceed 1500 p.s.i.

The cryogen container 14 is filled through a fill conduit 47 in which is installed a solenoid valve or quick disconnect 48 by which the conduit may be closed off after filling. The conduit 47 includes a straight section 47a, an arcuate section 47b which is held spaced between the outer shell and the shield by a support disc, and a straight section 47c which passes through the shield and the outer wall of the cryogen container.

Since some heat leakage to the cryogen containing vessel 14 is inevitable, an outlet vent is provided in the form of a conduit 50 which communicates with the cryogen container through an outlet port in the wall of the vessel 14. A throttling valve 51 is installed in the conduit 50 located adjacent the outlet port in the container vessel 14 and maintains the cryogen within its container at predetermined constant pressure and boiling point and therefore with a constant latent heat of vaporization.

The venting conduit 50 is wrapped around the cryogen container 14 in engaging relationship therewith over a distance substantially equal to the circumference of the container by being brazed or welded thereto and is similarly wrapped around the metallic shield in engaging relationship therewith before passing through the outer enclosing shell 25. The cryogen gas, on passing through the throttling valve, is subjected to a constant enthalpy expansion with a reduction in pressure and temperature, so that the venting conduit 50 serves as a refrigerating pipe and heat exchanger which assists in maintaining the stored liquid cryogen at a temperature below its boiling point at the controlled pressure. The refrigerating conduit 50 also provides for vapor cooling of the shield as the liquid cryogen boils away, and thereby provides additional thermal shielding.

For the storage of helium, hydrogen would generally be the preferred cryogen for providing the liquid shroud for the helium container. Neon, however, has a higher heat capacity per unit volume and for some applications may be preferred over hydrogen which has the higher heat capacity per unit mass. The boiling point of neon is also very low, 27° K. at atmospheric pressure, but its latent heat of vaporization and specific heat are much less than that of hydrogen.

To achieve long standing capability, the storage system of this invention relies heavily on the characteristics of the liquid cryogen shroud which provides an adiabatic wall around the stored fluid and it does not require extremely low heat leak values, whereas static insulation systems are totally dependent on low close tolerance heat leak requirements. Furthermore, since the gaseous fluid is loaded at essentially operational pressure, the storage system of this invention given the advantage of immediate availability for use rather than requiring a long pressure buildup time. Since the fluid is also loaded at a supercritical temperature, some of the ground support equipment problems which are attendant on the handling of cryogen liquids are eliminated. However, the most significant advantage of the storage system of this invention derives from the fact that after all liquid cryogen has evaporated, its weight is significantly less than the weight of conventional systems. If the period under consideration is extended beyond the period of evaporation, the advantage is even greater, so that this system is especially useful in space flights where the average weight of a system is of importance.

The storage system of this invention is, of course, adapted to the storage of gases other than helium. For example, oxygen gas might be stored with a liquid shroud of argon. The cyrogen selected in any instance, however, has a boiling point which is very near that of the fluid to be stored so as to keep the fluid at a low temperature and reasonable pressure. It should also have a relatively high latent heat of vaporization and a large sensible heat capability.

The containing vessels have been described herein as being of spherical shape which is particularly desirable for a cryogenic storage vessel since a sphere presents the minimum surface area for the maximum enclosed volume. This invention, of course, is adaptable to other shaped vessels, such as cylindrical vessels, which may be used where space limitations may become a factor.

Obviously, many modifications and variations of the present invention are possible in the light of the above teachings. It is therefore to be understood that within the scope of the appended claims the invention may be practiced otherwise than as specifically described.

What is claimed and desired to be secured by Letters Patent is:

1. In a cryogenic storage system for a dense gas, the combination comprising an inner pressure vessel for holding said dense gas;
   a second pressure vessel for containing a more expendable cryogenic gas in the liquid state, said second pressure vessel surrounding said inner pressure vessel;
   support means of low thermal conductivity material for holding said first and second vessels in spaced relationship to one another;
   an outer shell surrounding said second pressure vessel in spaced apart relationship thereto, and providing a vacuum space therebetween;
   a heat-conductive shield surrounding said second pressure vessel within said vacuum space between said second pressure vessel and said outer shell;
   a venting conduit fluidly communicating with said second pressure vessel and passing through said heat conductive shield and the outer shell for venting vaporized cryogenic gas, said conduit being disposed over a first part of its length in heat-exchanging engagement with said second pressure vessel and over another part of its length in heat-exchanging relationship with said heat conductive shield; and
   a throttling valve in said venting conduit for reducing the pressure and temperature of the vaporized cryogen which is vented through said conduit whereby the heat conductive shield and the second pressure vessel are subject to vapor cooling by the flow of vaporized refrigerant cryogen through the heat-exchanging venting conduit.

2. A cryogenic storage system as described in claim 1 wherein all the pressure vessel surfaces which are exposable to the liquid cryogen, and all vessel and other shell surfaces exposed to the vacuum, are provided with a low emissivity coating for reducing radiant heat transfer to the liquid cryogen and the dense gas.

3. A cryogenic storage system for a dense gas, said system comprising an inner pressure vessel for holding said dense gas;
   a second pressure vessel containing a more expendable cryogenic gas in the liquid state, said second pressure vessel surrounding said inner pressure vessel whereby the liquid cryogen provides a liquid shroud enveloping said inner pressure vessel;
   support means of low thermal conductivity material for holding said first and second vessels in spaced relationship to one another;
   a heat-conductive thermal radiation shield surrounding said second pressure vessel and supported in spaced relation from said second pressure vessel by means of support members of low thermal conductivity material, with the space between said shield and second pressure vessel being a vacuum space;
   an outer shell member surrounding said heat conductive shield and supported in spaced relationship thereto by support members of low thermal conductivity material with the space between the outer shell and the heat-conductive shield constituting a vacuum space;
   a venting conduit fluidly communicating with said second pressure vessel and passing through said heat conductive shield and the outer shell for venting vaporized cryogenic gas, said conduit being disposed over a first part of its length in heat-exchanging engagement with said second pressure vessel and over another part of its length in heat-exchanging relationship with said heat-conductive shield; and
   a throttling valve in said venting conduit for reducing the pressure and temperature of the vaporized cryogen which is vented through said conduit, whereby the heat-conductive shield and the second pressure vessel are subject to vapor cooling by the flow of vaporized refrigerant cryogen through the heat-exchanging venting conduit.

4. A cryogenic storage system as described in claim 3 wherein all the pressure vessel surfaces which are exposable to the liquid cryogen and all vessel and outer shell surfaces exposed to the vacuum are provided with a low emissivity coating for reducing radiant heat transfer to the liquid cryogen and the dense gas.

5. A cryogen storage system as described in claim 3 wherein the liquid cryogen contained by said second pressure vessel is characterized by a high latent heat of vaporization, high heat sink capacity, and a low temperature boiling point near the boiling point of the dense gas.

6. In a cryogenic storage system for storing a dense gas, the combination comprising an inner pressure vessel for holding the dense gas, said inner pressure vessel having inlet means and outlet means;
   valve means operatively associated with said outlet means for controlling the pressure of gas within said inner pressure vessel;
   a second pressure vessel for containing a more expendable cryogenic gas in the liquid state, said second pressure vessel surrounding said inner pressure vessel;
   support means of low thermal conductivity material for holding said first and second vessels in spaced relationship to one another;
   an outer shell surrounding said second pressure vessel in spaced apart relationship thereto and providing a vacuum space therebetween;
   a heat conductive thermal radiation shield surrounding said second pressure vessel and positioned within said outer shell; and
   a venting conduit fluidly communicating with said second pressure vessel and passing through said heat conductive shield and the outer shell for venting vaporized cryogenic gas, said conduit being disposed over a first part of its length in heat-exchanging engagement with said second pressure vessel, and over another part of its length in heat-exchanging relationship with said heat conductive shield.

7. A cryogenic storage system as described in claim 6 wherein all the pressure vessel surfaces which are exposable to the liquid cryogen and all vessel and outer shell surfaces exposed to the vacuum are provided with a low emissivity coating for reducing radiant heat transfer to the liquid cryogen and the dense gas.

References Cited by the Examiner

UNITED STATES PATENTS

| | | | |
|---|---|---|---|
| 2,643,022 | 6/1953 | Cornell | 62—45 X |
| 2,834,187 | 5/1958 | Loveday | 62—51 |
| 2,871,669 | 2/1959 | Mann et al. | 62—54 |
| 3,087,311 | 4/1963 | Rousseau | 62—54 |
| 3,092,972 | 6/1963 | Poorman et al. | 62—52 |
| 3,110,156 | 11/1963 | Niemann | 62—45 |
| 3,119,238 | 1/1964 | Chamberlain et al. | 62—54 |
| 3,176,473 | 4/1965 | Andonian | 62—54 X |
| 3,177,672 | 4/1965 | Seelandt | 62—54 X |
| 3,182,462 | 5/1965 | Long et al. | 62—45 X |
| 3,195,620 | 7/1965 | Steinhardt | 62—45 X |

FOREIGN PATENTS 914,193   12/1962   Great Britain.

LLYOD, L. KING, *Primary Examiner.*